UNITED STATES PATENT OFFICE.

RICHD. W. CHAPPELL, OF CHICAGO, ILLINOIS.

IMPROVED WASHING-COMPOUND.

pecification forming part of Letters Patent No. 49,977, dated September 19, 1865; Reissue No. 2,364, dated September 25, 1866.

*To all whom it may concern:*

Be it known that I, RICHARD W. CHAPPELL, of Chicago, in the county of Cook and State of Illinois, have invented a new and useful Improved Washing-Compound; and I do hereby declare and make known that the following is a full, clear, and exact description of the same, sufficient to enable those skilled in the art to make and use it.

The nature of my said invention consists in compounding together in certain proportions certain ingredients hereinafter specified, forming a compound to be used for washing purposes, whereby a great saving in time, labor, and convenience is effected.

The ingredients used in making my washing-compound are unslaked lime, sal-soda, borax, salt of tartar, ammonia, and water. If desired, alcohol may be added; but its effect is not material, and I generally omit it.

I compound the said ingredients in the following manner, and in substantially the following proportions: I boil one-half of one pound of unslaked lime in one gallon of water for about five minutes, and let the liquid stand until it can be drawn off clear from the lime, which is then done. I then dissolve about six pounds of sal-soda, one and one-half pound of borax, and four ounces of salt of tartar in a gallon of hot water, adding or stirring in, when cold, about four ounces of liquid ammonia, which is then mixed with the lime-water aforesaid, and to this mixture is then added eight gallons of cold water, and the whole thoroughly stirred and intermingled, making about ten gallons of the said compound.

For a less quantity of the compound, the quantities of the ingredients should be proportionally less, and for a greater quantity proportionally greater. Nor do I confine myself to the precise quantities herein specified, as the same may be varied to a considerable extent without changing the nature of the said compound or its practical effects. The order and manner of compounding are likewise immaterial, and may be varied, if desired.

To use my said compound, I give the following general directions: The soiled clothes, after being rubbed over with soft soap upon those parts which are most soiled, are put to soak over night. In the morning have ready a boiler containing about four gallons of hot water, to which add one-half of one pint of the aforesaid compound and one-half pint of soft soap, or one-fourth pound bar-soap, cut fine. The clothes should then be wrung out from the soak and placed in a tub, and the hot water containing the compound poured upon them, so as to cover the clothes. The same quantity of water and of the compound is then put into the boiler and heated. After the clothes have soaked in the tub about fifteen or twenty minutes, they are rubbed slightly where most soiled or necessary, and wrung out and put into the boiler and boiled for about five (5) minutes, when they are rinsed and blued, if desired, wrung, and hung out to dry.

The finer and cleaner pieces should be washed separately from the more soiled and coarser articles, and the same mixture used for the finer and cleaner clothes may afterward be used for the coarser and more soiled pieces.

Having described the manner of compounding and using my compound, I will specify what I claim and desire to secure by Letters Patent.

A washing-compound composed of unslaked lime, sal-soda, borax, salt of tartar, and ammonia, in the proportions substantially as herein specified and described.

R. W. CHAPPELL.

Witnesses:

W. E. MANS,

G. W. HANK.